June 7, 1966  R. O. DURHAM  3,254,637
VALVE ACTUATOR

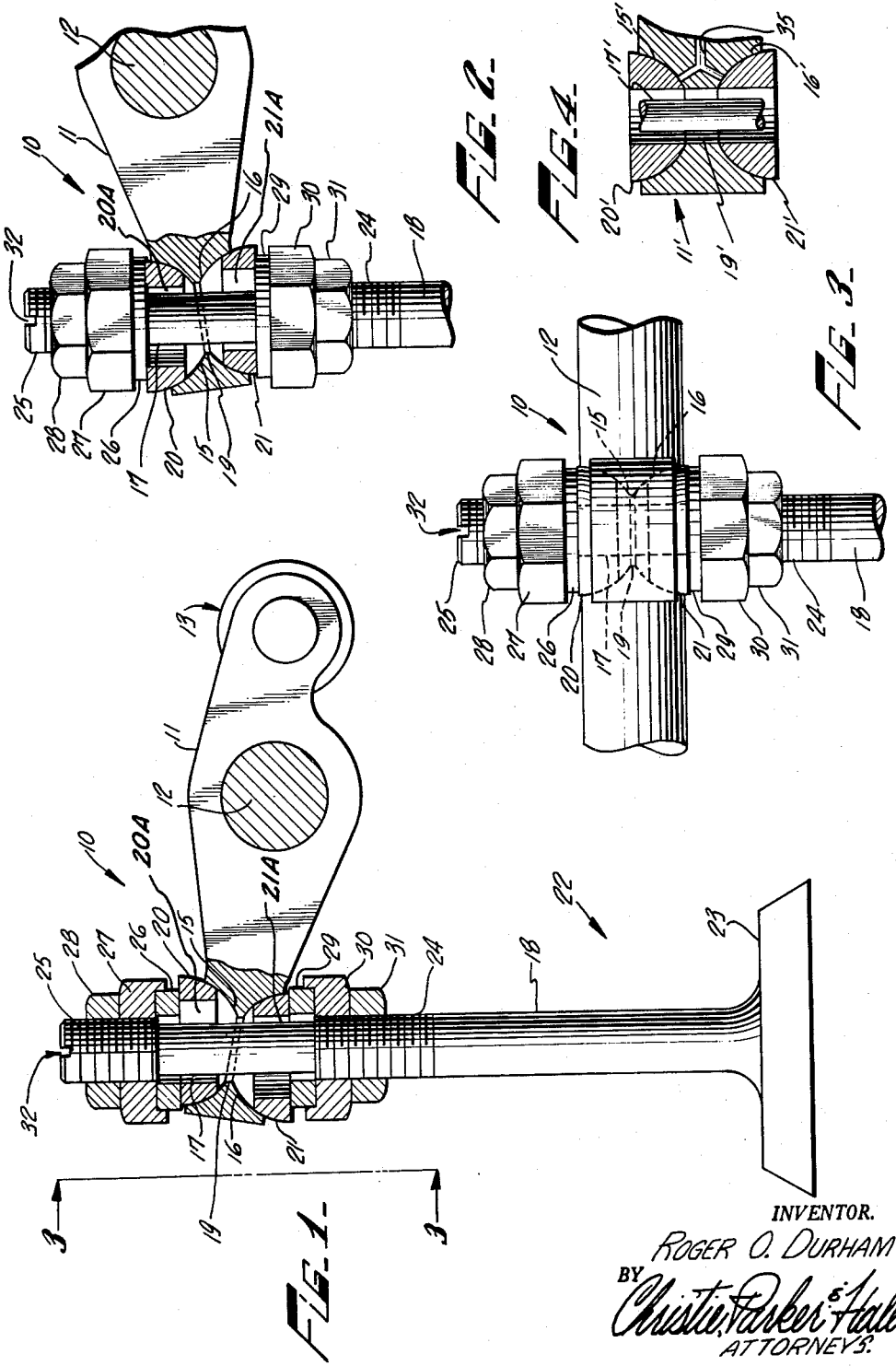

Filed Oct. 3, 1962  3 Sheets-Sheet 2

June 7, 1966  R. O. DURHAM  3,254,637
VALVE ACTUATOR
Filed Oct. 3, 1962  3 Sheets-Sheet 3

INVENTOR.
ROGER O. DURHAM
BY
Christie, Parker & Hale
ATTORNEYS.

United States Patent Office 3,254,637
Patented June 7, 1966

1

3,254,637
VALVE ACTUATOR
Roger O. Durham, 3966 Marathon St.,
Los Angeles, Calif.
Filed Oct. 3, 1962, Ser. No. 228,192
27 Claims. (Cl. 123—90)

This application is a continuation-in-part of my copending application Serial No. 132,715, filed on August 18, 1961, and now abandoned.

This invention relates to a poppet valve actuator of the desmodromic type for use in internal combustion engines and the like.

Poppet valve actuator assemblies for use with internal combustion engines and the like are generally divided into two types: an assembly utilizing positive mechanical opening and a spring closure of the valve; and, an assembly utilizing both positive mechanical opening and closing of the valve.

The first type, that utilizing a positive mechanical opening and spring closing, has generally proved to be the most satisfactory and practical type of valve actuator assembly, and is in general use.

Prior valve assemblies of the second type, referred to herein as the desmodromic type and which utilize positive mechanical means for opening and closing the valve, while possessing a number of advantages over the spring return type, have not heretofore been able to function with sufficient reliability to be satisfactory for general use. In addition, such prior valve assemblies have involved complex mechanical structures, so as to be impractical for ordinary usage.

One type of such an assembly employs a rocker arm having a forked termination which engages a fitting attached to the valve stem. Contact between forked termination and fitting in such a device to initiate the positive valve stem displacement is limited to a line of contact at any instant. Thus, the contacting surfaces are subject to great wear, and the assembly requires frequent and precise adjustment to maintain the required and proper clearances. In addition, such linkage often has not left the valve free to rotate on its seat. Such a device is illustrated by U.S. Patent No. 1,671,973.

Another type of desmodromic valve actuator assembly utilizes a primary cam and a secondary cam attached to a cam shaft. The primary cam moves to open the valve by riding against the valve stem termination. The secondary cam engages a bell crank which in turn engages the valve stem termination, which linkage is operable to close the valve. Such an assembly is illustrated in U.S. Patent No. 2,814,283, and, while having achieved notable success in certain auto racing applications, has proven to be too complex for general usage.

According to the invention, a desmodromic valve actuator linkage between a pivoted rocker arm and a valve stem utilizes a pair of oppositely disposed parti-circular surfaces in the rocker arm, which surfaces are either convex or concave, between which surfaces an aperture is formed so that the surfaces and aperture are aligned along the axis of the valve stem when the rocker arm is approximately in its mid-position. As used herein, "parti-circular" refers to either a convex or a concave circular cross-sectional configuration in the plane of movement of the rocker arm. On each of the surfaces there is disposed a complementary parti-circular washer so as to be in mating engagement with the surface. In a preferred embodiment, these washers are parti-spherical, the term "parti-spherical" referring to either a convex or a concave surface configuration which is a portion of a sphere. These washers are frusto-spherical in a preferred modification of the preferred embodiment, the term "frusto-spherical" referring to a convex external surface configuration having a spherical lateral surface and parallel planar top and bottom surfaces. Each of the washers has a central longitudinal aperture extending therethrough. When utilizing frusto-spherical washers, this aperture is preferably perpendicular to the parallel top and bottom surfaces thereof. In certain embodiments, the surface configurations are "parti-cylindrical," that is, either a convex or a concave longitudinal section of a cylinder.

The valve stem extends through the washer apertures and the rocker arm aperture and is of a diameter selected so as to be lesser than the smallest of these aperture diameters. Means are provided to fix the longitudinal position of the valve stem with respect to each of the washers, while simultaneously providing for lateral slippage between the fixing means and each washer. Thus, the movement of the rocker arm results in the movement of the valve stem in unison therewith so as to provide for the linear reciprocal actuation of the valve.

The invention may be more readily understood by referring to the accompanying drawing in which:

FIGURE 1 is an elevation view, partially in section, of a desmodromic valve actuator assembly of the preferred embodiment of the invention when in its closed position;

FIGURE 2 is a partial view of the device of FIGURE 1 when in its opened position;

FIGURE 3 is a view taken along lines 3—3 of FIGURE 1 and illustrating the device in an intermediate position;

FIGURE 4 is a partial section of an alternate embodiment of disposition of parti-spherical recesses and illustrates parti-spherical washers which are not frusto-spherical;

Figure 5:
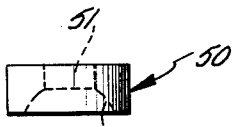
FIGURE 5 is an elevation of an alternate embodiment of washer.

Referring now to FIGURE 1, a desmodromic valve actuator assembly 10 includes a rocker arm 11 which pivots about a rocker support shaft 12. At one end of the rocker arm 11 is located a roller assembly 13. The roller assembly 13 is utilized to initiate the pivoting of the rocker arm 11, preferably by riding between a pair of cams, movement of the surfaces of which cause reciprocating movement of the roller 13. However, the particular mechanism which initiates the pivoting of the rocker arm 11 form no part of the present invention, and any of the various conventional systems can be utilized. At the end of the rocker arm 11 opposite the roller assembly 13, there are formed a first parti-spherical recess 15, and a second parti-spherical recess 16. The first and second parti-spherical recesses 15 and 16 intersect so as to form a circular aperture through which a reduced portion 17 of a valve stem 18 extends. This aperture is preferably widened into a cylindrical passage 19 in order to provide a smooth surface at the recess intersection. The plane of intersection of the parti-spherical recesses is perpendicular to the valve stem longitudinal axis when the rocker arm is in its mid-position (see FIGURE 3).

A first frusto-spherical washer 20 of dimensions such as to mate with the first parti-spherical recess 15 is disposed in the recess 15, it being understood that the washer dimensions provide for the necessary tolerance to permit the movement of the washer 20 in the recess 15 while maintaining mating engagement of the washer 20 with the recess 15. Similarly, a second frusto-spherical washer 21 is disposed in the second parti-spherical recess 16. It will be noted that each of the washers 20, 21 has a central longitudinal passage 20A, 21A, respectively, extending therethrough.

A valve 22 includes a valve head 23 and the valve stem 18. The valve stem 18 has threaded portions 24 and 25 formed thereon, between which the reduced portion 17 is formed. The reduced portion 17 is preferably of a diameter slightly less than the minor diameter of the threaded portions 24 and 25. The reduced portion 17 diameter, as is apparent from FIGURE 1, is also lesser than the diameters of the passages 20A, 21A extending through the washers 20 and 21, and of the rocker arm passage 19. A screwdriver slot 32 is provided at the end of valve stem 18 to prevent rotation of the valve during adjustment, although many alternate means for preventing said rotation are possible.

A first thrust washer 26 engages the base of the first frusto-spherical washer 20 and is held thereagainst by a first stop nut 27. The stop nut 27 is fixed in position by a lock nut 28 which is in threaded engagement with the threaded valve stem portion 25. The thrust washer 26 and nuts 27 and 28 simultaneously hold the first frusto-spherical washer 20 in mating engagement with the parti-spherical recess 15 and connect the washer 20 to the valve stem 18. Similarly, a second thrust washer 29, stop nut 30, and lock nut 31, are provided. These two washer and nut assemblies fix the longitudinal position of the valve stem 18 with respect to the rocker arm 11 while simultaneously providing for lateral slippage between the washers 20, 21 and their respective washer and nut assemblies 26, 27, 28 and 29, 30, 31. It will be noted that the stop nuts 27 and 30 partially enclose the thrust washers 26 and 29, so as to hold them in place. While this structure for connecting the valve stem to the parti-spherical washers is preferred, other systems can obviously be utilized in the practice of the invention.

In operation, upon the movement upward of the roller assembly 13, the rocker arm 11 pivots counter-clockwise, thus forcing the valve stem 18 downward. However, the movement of the rocker arm 11 is a rotary one, whereas the movement of the valve stem 18 is required to be linear. The frusto-spherical washers 20, 21 convert the arcuate motion of the rocker arm end with which they are in contact into linear motion of the valve stem by reciprocating within the parti-spherical recesses 15 and 16 and sliding along the surfaces of thrust washers 26 and 29, which the frusto-spherical washers 20, 21 contact.

Thus, whereas in desmodromic valve actuators previously used, a narrow line of contact between the rocker arm and the valve stem was provided by the linkage, in the present invention a broad surface of contact is provided, thereby greatly reducing the wear which occurs during operation.

Referring to FIGURE 2, there is shown the valve actuator assembly 10 when in its opened position. It will be noted that the relative lateral positions of the two frusto-spherical washers 20 and 21 have been reversed with respect to their positions in FIGURE 1. However, the apertures in the washers 20 and 21 are of sufficient diameter to permit the lateral movement of the washers with respect to the valve stem portion 17 without contacting the stem. The second frusto-spherical washer 21 and thrust washer 29 have transmitted the downward motion to the valve stem 18 through the nuts 30 and 31. Upon the clockwise rotation of the rocker arm 11, the valve stem 18 will be moved upwardly by the thrust transferred from the rocker arm 11 through the first frusto-spherical washer 20 and first thrust washer 26 to the nuts 27 and 28. The washers 20 and 21 thus return to resume the positions shown in FIGURE 1 in closing the valve.

FIGURE 3 is an elevation of the linkage of FIGURE 1 when in a position intermediate between the positions shown in FIGURE 1 and FIGURE 2, and viewed along lines 3—3 of FIGURE 1. FIGURE 3 illustrates the symmetrical disposition of the linkage and recesses.

FIGURE 4 illustrates an alternate disposition of the parti-spherical recesses. In FIGURE 4, a rocker arm 11' has parti-spherical recesses 15' and 16' formed therein in alignment with a cylindrical passage 19' extending therebetween. The parti-spherical recesses do not intersect in this embodiment. In addition, a lubricating passage 35 extends through the rocker arm 11' and onto the parti-spherical recesses to supply lubricant to the linkage. If desired, the passage 35 could open directly into the passage 19'. Of course, such a lubricating passage is equally utilizable with the embodiment of FIGURES 1–3. It will also be noted that washers 20' and 21' are parti-spherical but not frusto-spherical. While the use of frusto-spherical washers is preferred, such parti-spherical washers can be used in the embodiment of FIGURES 1–3. Similarly, frusto-spherical washers can be used in the embodiment of FIGURE 4.

Referring now to FIGURE 5, there is shown an embodiment of washer for use with an alternate embodiment of the invention. In FIGURE 5, the washer 50 has a general configuration of a round plinth. Through the central portion of the washer 50 there extends an aperture 51 which opens on to a parti-spherical shoulder 52. The shoulder 52 is adapted to mate with a complementary portion of the rocker arm, as will be subsequently described.

Figure 7:
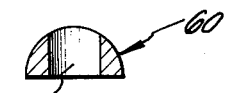
FIGURE 7 is an elevation in section taken along lines 7—7 of FIGURE 6.
Figure 6:
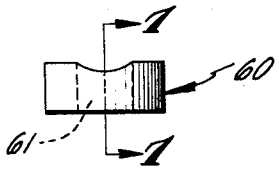
FIGURE 6 is an elevation of another alternate embodiment of washer.

In FIGURE 6, there is shown another alternate embodiment of the washer for use with the invention. In FIGURE 6, a washer 60 is parti-cylindrical, having the general configuration of a longitudinal portion of the cylinder and being arcuate in cross-section, as is shown more clearly in FIGURE 7. The washer 60 has an aperture 61 extending transversely therethrough and preferably spaced equidistantly from the ends of the washer 60. The aperture 61 is more clearly shown in FIGURE 7, which is a cross-section taken along lines 7—7 of FIGURE 6.

Figure 9:
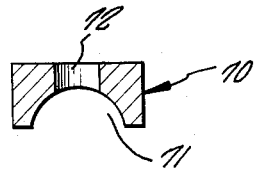
FIGURE 9 is an elevation in section taken along lines 9—9 of FIGURE 8.
Figure 8:
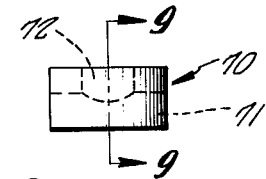
FIGURE 8 is an elevation of another alternate embodiment of washer.

In FIGURE 8, there is shown another alternate embodiment of the washer for use with the invention. In FIGURE 8, a washer 70 has a general rectangular configuration and has a parti-cylindrical recess 71 extending longitudinal therealong. An aperture 72 extends transversely through the washer 70 and opens into the recess 71, as is more clearly shown in FIGURE 9, which is a cross-section taken along lines 9—9 of FIGURE 8.

Figure 10:
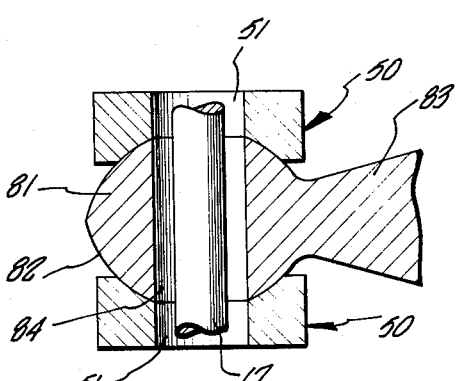
FIGURE 10 is an elevation in section of an alternate embodiment of the invention utilizing two washers of the type shown in FIGURE 5.

Referring now to FIGURE 10, there is shown an alternate embodiment of the invention utilizing a pair of washers 50. The washers 50 mate with a pair of convex seats 81, 82 disposed at the end of a rocker arm 83. The valve stem 17 extends through an aperture 84 at the end of the rocker arm 83 whereat the seats are disposed. The washers 50 are held in place by any appropriate system. For example, the strutcure of FIGURE 1 may be utilized.

Figures 11, 12:
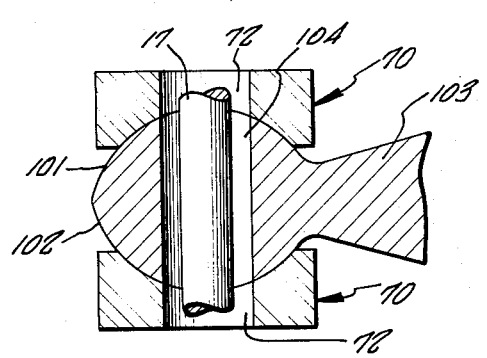
FIGURE 11 is an elevation in section of an alternate embodiment of the invention utilizing two washers of the type shown in FIGURE 6.
FIGURE 12 is an elevation in section of an alternate embodiment of the invention utilizing two washers of the type shown in FIGURE 8.

In FIGURE 11, there is shown another alternate embodiment of the invention. In FIGURE 11, a pair of washers 60 are disposed in a pair of parti-cylindrical recesses 91, 92 formed in a rocker arm 93. An aperture 94 extends through the rocker arm 93 so as to open onto the recesses 91, 92. The valve stem 17 extends through the recess 94 in the rocker arm and the recesses 61 in the washers 60. Recalling FIGURE 6, it will be understood that the recesses 91 are arcuate in cross-section and extend transversely across the rocker arm 93, so as to mate with the washer 60, rather than being the parti-spherical recesses illustrated in the embodiment of FIGURE 1.

In FIGURE 12, there is shown another alternate embodiment of the invention, in which a pair of washers 70 mate with a pair of convex parti-cylindrical seats 101, 102 disposed on the end of a rocker arm 103. An aperture 104 extends through rocker arm 103 at the seats 101, 102 so as to form a passage in conjunction with the apertures 72 of the washers within which the valve stem 17 is disposed.

Figure 13:
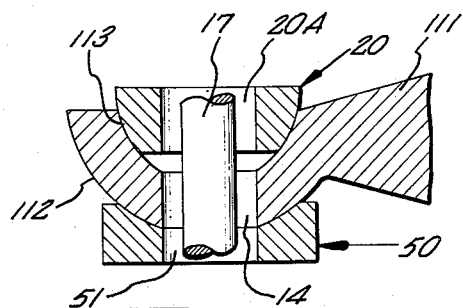
FIGURE 13 is an elevation in section of an alternate embodiment of the invention utilizing a washer of the type shown in FIGURE 1 and a washer of the type shown in FIGURE 5.

In FIGURE 13, there is shown an alternate embodiment of the invention in which the washers utilized are dissimilar. Thus, in FIGURE 13, a rocker arm 111 has a parti-spherical seat 112 formed on one side of the end thereof and a parti-spherical recess 113 formed opposite the seat. Within the recess 113, there is disposed a washer 20 and a washer 50 is mounted on the seat 112. An aperture 114 extends between the seat 112 and the recess 113 so as to form a passage in conjunction with the apertures 20A and 51, within which is disposed the valve stem 17. As in the embodiments previously described, the valve stem 17 may be held in position in conjunction with washers 20, 50 by any appropriate means, such as the means shown in FIGURE 1.

Figure 14:
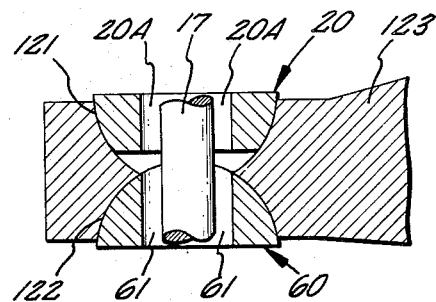
FIGURE 14 is an elevation in section of an alternate embodiment of the invention utilizing a washer of the type shown in FIGURE 1 and a washer of the type shown in FIGURE 6.

In FIGURE 14, there is shown another embodiment of the invention in which dissimilar washers 20 and 60 are disposed in mating engagement with a parti-spherical recess 121 and a parti-cylindrical recess 122 formed in a rocker arm 123. The recesses 121 and 122 open into each other, and thus there is no requirement, in this embodiment as shown in FIGURE 14, of a connecting aperture as has been illustrated in FIGURES 10 thru 13. However, if desired, the rocker arm 123 can be of a thickness and the recesses 121, 122 of a depth such that the recesses do not intersect. In such a case, it will be understood that a connecting aperture is used in order to permit the valve stem 17 to pass through the recesses 20A, 61 of the washers 20, 60. It will be further noted that, in the embodiment of FIGURE 14, the recess 121 is a parti-spherical recess, while the recess 122 is arcuate in cross-section and extends transversely across the rocker arm 123.

Figure 15:
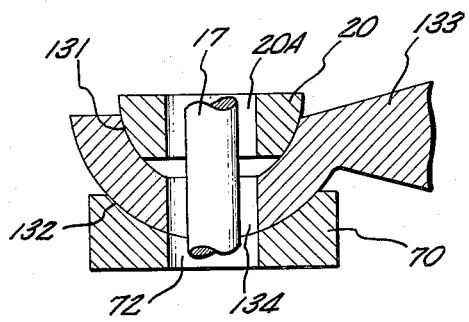
FIGURE 15 is an elevation in section of an alternate embodiment of the invention utilizing a washer of the type shown in FIGURE 1 and a washer of the type shown in FIGURE 8.

In FIGURE 15, there is shown another alternate embodiment of the invention which utilizes a washer 20 and a washer 70 in mating engagement with a parti-spherical recess 131 and a parti-cylindrical seat 132 formed at the end of a rocker arm 133. An aperture 134 connects the seat 132 and recess 131 and has the valve stem 17 disposed therewithin.

Figure 16:
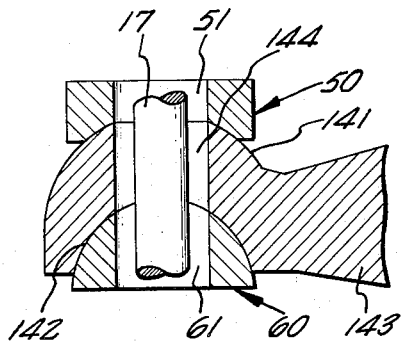
FIGURE 16 is an elevation in section of an alternate embodiment of the invention utilizing a washer of the type shown in FIGURE 5 and a washer of the type shown in FIGURE 6.

In FIGURE 16, there is shown another alternate embodiment of the invention in which a washer 50 and a washer 60 are disposed in mating engagement with a parti-spherical seat 141 and a parti-cylindrical recess 142 formed in a rocker arm 143. An aperture 144 extends between the seat 141 and recess 142 and has the valve stem 17 disposed therewithin.

Figure 17:
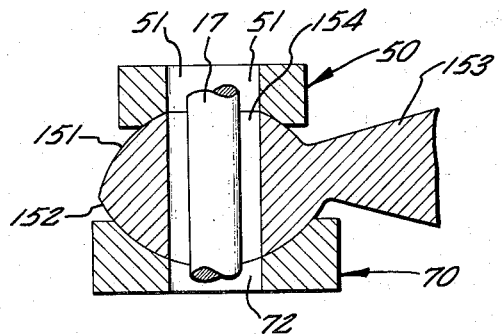
FIGURE 17 is an elevation in section of an alternate embodiment of the invention utilizing a washer of the type shown in FIGURE 5 and a washer of the type shown in FIGURE 8.

In FIGURE 17, there is shown another embodiment of the invention in which a washer 50 and washer 70 are disposed in mating engagement with a parti-spherical seat 151 and a parti-cylindrical seat 152, respectively, formed at the end of a rocker arm 153. An aperture 154 extends between the bosses 151 and 152 and the valve stem 17 passes therethrough.

Figure 18:
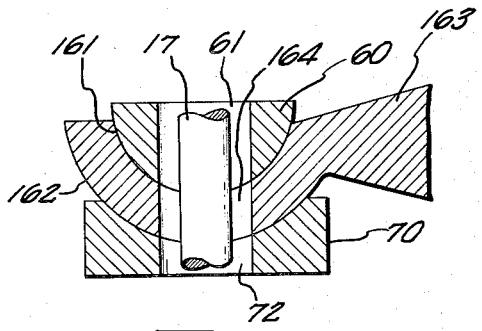
FIGURE 18 is an elevation in section of an alternate embodiment of the invention utilizing a washer of the type shown in FIGURE 6 and a washer of the type shown in FIGURE 8.

In the embodiment of FIGURE 18, a washer 60 and a washer 70 are disposed in mating engagement with a parti-cylindrical recess 161 and a parti-cylindrical seat 162, respectively, formed at the end of a rocker arm 163. An aperture 164 extends between the recess 161 and seat 162 and has the valve stem 17 disposed therewithin.

It will be understood that, in each of the embodiments shown in FIGURES 10 through 18, the respective seats and recesses are of a configuration such as to be complementary to the shape of the washers utilized therewith. In each of these embodiments, as has been pointed out, any appropriate means for fixing the valve stem with respect to the washers may be utilized. Especially preferred is the means shown in FIGURE 1. It will be further understood that, while no means for lubricating the washers has been shown in FIGURES 10 through 18, any appropriate means to accomplish such lubrication can be utilized. Thus, for example, the structure on FIGURE 4 can be adapted to the various alternate embodiments of FIGURES 10 through 18.

In each of the embodiments shown in FIGURES 1–18, it should be noted that the washer and the rocker arm each have a surface held in contact with the other in order to fix the position of the valve stem. In each of the embodiments shown, these contacting surfaces are parti-circular and further, each embodiment utilizes a parti-circular recess formed in either the rocker arm or the washer and a complementary parti-circular mating face formed in the other. Thus, in FIGURES 1, 11, 13, 14, 15, 16 and 18, there is a parti-circular recess formed in the rocker arm. More particularly, the parti-circular recess is a parti-spherical recess in FIGURES 1, 13, 14 and 15, these figures illustrating embodiments which utilize the washer 20. In FIGURES 10, 12, 13, 15, 16, 17 and 18, a washer is utilized which has a parti-circular recess formed therein and a complementary parti-circular surface is formed in the rocker arm. In FIGURES 10, 13, 16 and 17, those figures illustrating embodiments utilizing the washer 50, the recess formed in the washers is parti-spherical and the complementary surface on the rocker arm is likewise parti-spherical.

In FIGURES 11, 14, 16 and 18, those figures illustrating embodiments utilizing the washer 60, a parti-cylindrical recess is formed on the rocker arm, the washer 60 being parti-cylindrical and, when in engagement with the recess in the rocker arm, being arcuate in its cross-section in the plane of motion of the rocker arm. In FIGURES 12, 15, 17 and 18, those figures utilizing the washer 70, the rocker arm has a parti-cylindrical seat formed thereon which mates with a complementary parti-cylindrical recess in the washer.

Figure 19:
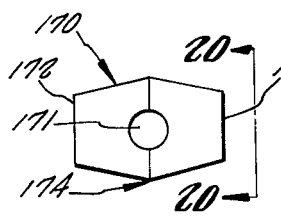
FIGURE 19 illustrates a modification of a parti-cylindrical washer.
Figures 20, 21:
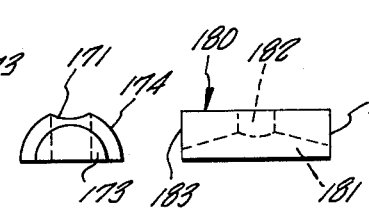
FIGURE 20 is a view taken along lines 20—20 of FIGURE 19.
FIGURE 21 is a side elevation of another modification of a parti-cylindrical washer.

Referring now to FIGURES 19 and 20, there is shown a washer 170 having a central aperture 171 extending therethrough. It will be noted that the washer 170 has a pair of opposite ends 172, 173 and an enlarged central portion 174 which tapers inwardly toward the ends 172, 173. As is most clearly apparent in FIGURE 19, the taper from the central portion 174 to the ends 172, 173 is a regular or conical taper. However, the taper could equally well be stepped or curved. Such a taper need not necessarily, therefore, be arcuate, so long as the corresponding recess formed in the rocker arm is the complement of the taper of the washer. It will be noted that the washer 170 is a parti-circular washer and is, in fact, a modification of the parti-cylindrical washer 60 described previously.

In FIGURE 21, there is shown a washer 180 which is a modification of the parti-cylindrical washer 70 in the same respects as the washer 170 of FIGURE 19 is a modification of the parti-cylindrical washer 60. Thus, the washer 180 has a recess 181 into which a central aperture 182 opens. The recess 181 tapers from a central aperture to a pair of ends 183, 184 of the washer 180. The washer 180 is utilized with a complementary boss formed on the rocker arm as a mating surface. While the taper of the recess 181 has been shown as regular or conical, the taper could equally well be stepped or curved, so long as the requirement is met that the cross-section of the recess 181 be arcuate in the plane of motion of the rocker arm, so that the washer is a parti-circular washer.

Figure 22:
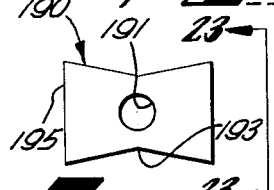
FIGURE 22 is a plan view of another modification of a parti-cylindrical washer.
Figure 23:
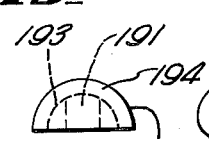
FIGURE 23 is an elevation taken along lines 23—23 of FIGURE 22.

Referring now to FIGURE 22, there is shown another embodiment of the invention in which a washer 190 is another modification of the parti-cylindrical washer 60. The washer 190 has a central aperture 191 extending therethrough. The washer 190 is formed so as to have a constricted central portion 193 which tapers outwardly to the ends 194, 195. While the taper is shown as a regular or conical taper, it could equally well be stepped or curved. FIGURE 23 is a view taken along lines 23—23 and illustrates the washer 190. It will be noted that the washer 190 is parti-circular.

Figure 24:
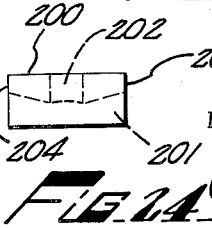
FIGURE 24 is a side elevation illustrating another modification of a parti-cylindrical washer.

FIGURE 24 illustrates a washer 200 which is a modification of the washer 70 in the same respects as the washer 190 is a modification of the washer 60. Thus, the washer 200 has a recess 201 into which a central aperture 202 opens. The recess tapers from the central 202 to the ends 203, 204 in a regular or conical taper. However, the taper could equally well be stepped or curved, as has previously been discussed with respect to the modification of FIGURES 19 through 23. It will thus be noted that the washer 200 is a parti-circular washer and is utilized with a complementary seat as a mating surface formed on the rocker arm.

For purposes of determining the scope of the following claims, the term "parti-cylindrical," as used therein, comprehends the preferred configurations shown in FIGURES 6–9, as well as the modifications thereat shown in FIGURES 19–24 and the modifications in configurations discussed with respect thereto.

The invention claimed is:

1. In a desmodromic valve actuator linkage connecting a rocker arm to a valve stem, the combination of a pair of washers, means for fixing the longitudinal position of said washers with respect to said valve stem and for holding said washers against oppositely directed surfaces of said rocker arm so as to permit the lateral movement of the washers with respect to the valve stem, said washers each having a surface in mating contact with one of said oppositely directed surfaces of the rocker arm, said mating surfaces being a parti-circular recess formed in one of said surfaces, and a complementary mating face formed on the other of said surfaces.

2. The combination of claim 1 and in which the recess and complementary face are parti-spherical.

3. A desmodromic valve actuator linkage connecting a rocker arm to a valve stem comprising parti-spherical recesses formed in opposed relation in the rocker arm and through which the valve stem extends, a mating parti-spherical washer disposed in each of said parti-spherical recesses and having an aperture through which the valve stem extends, and means releasably engaging the valve stem for holding the parti-spherical washers in the parti-spherical recesses during rocker arm motion.

4. In a desmodromic valve actuator linkage connecting a rocker arm to a valve stem the combination of a first parti-circular surface formed on said rocker arm, a second parti-circular surface formed on said rocker arm in axial alignment with said first parti-circular surface, a first washer having a parti-circular surface formed thereon which is complementary to said first parti-circular surface on said rocker arm, a second washer having a parti-circular surface formed thereon which is complementary to the second parti-circular surface formed on the rocker arm, and means for attaching said washers to said valve stem and for holding said washers in mating engagement with said rocker arm at said parti-circular surfaces.

5. The combination of claim 4 and in which said first parti-circular surface on said rocker arm is a recess and the parti-circular surface on said first washer is convex.

6. The combination of claim 5 and in which said first parti-circular recess is parti-cylindrical and in which said second parti-circular surface is a parti-cylindrical recess and the parti-circular surface of said second washer is a convex parti-cylindrical surface.

7. The combination of claim 5 and in which the said first parti-circular surface is parti-spherical, and in which said second parti-circular surface is a recess formed in said rocker arm and said parti-circular surface on said second washer is convex.

8. The combination of claim 7 and in which said second parti-circular recess is parti-spherical.

9. The combination of claim 7 and in which said second parti-circular recess is parti-cylindrical.

10. The combination of claim 5 and in which said second parti-circular surface formed on said rocker arm is a convex seat.

11. The combination of claim 10 and in which said parti-circular recess is parti-spherical.

12. The combination of claim 11 and in which said convex seat is parti-spherical.

13. The combination of claim 11 and in which said convex seat is parti-cylindrical.

14. The combination of claim 10 and in which said parti-circular recess is parti-cylindrical.

15. The combination of claim 14 and in which said parti-circular seat is parti-spherical.

16. The combination of claim 14 and in which said parti-circular seat is parti-cylindrical.

17. The combination of claim 4 and in which the first parti-circular surface on said rocker arm is a seat and the parti-circular surface on said first washer is concave.

18. The combination of claim 17 and in which the first parti-circular seat is parti-cylindrical and in which said second parti-circular surface is a parti-cylindrical seat.

19. The combination of claim 17 and in which the first parti-circular surface is parti-spherical and in which the second parti-circular surface is a seat.

20. The combination of claim 17 and in which the second parti-circular surface is parti-spherical.

21. The combination of claim 17 and in which the second parti-circular surface is parti-cylindrical.

22. In a desmodromic valve actuator linkage connecting a rocker arm to a valve stem comprising a pair of parti-circular recesses formed in axial alignment in said rocker arm, means forming a communicating passage between said parti-circular recesses, a mating parti-circular washer disposed in each of said parti-circular recesses, and means for simultaneously holding the parti-circular washers in mating engagement with the parti-circular recesses and connecting the parti-circular washers to the valve stem.

23. In a desmodromic valve actuator assembly, the combination of a pivoted rocker arm, a pair of parti-spherical recesses in the rocker arm which are aligned along an axis and are connected together by an aperture, a pair of parti-spherical washers disposed one in each of said parti-spherical recesses so as to be in mating engagement therewith, each of said parti-spherical washers having a central longitudinal aperture extending therethrough so as to open into the connecting aperture, a valve stem extending through the washer apertures and the connecting aperture, and means for fixing the longitudinal position of the valve stem with respect to each of the parti-spherical washers.

24. Apparatus according to claim 23 wherein the washers are frusto-spherical.

25. Apparatus according to claim 23 wherein the parti-spherical recesses intersect.

26. Apparatus according to claim 23 and including means for lubricating said washers while in mating engagement with said recesses.

27. In a desmodromic valve mechanism for an internal combustion engine having a reciprocable valve stem and an angularly oscillating rocker arm having a hole of diameter greater than the diameter of the valve stem formed therethrough, a parti-circular surface defined by the rocker arm circumferentially of each end of the hole, a washer having formed therethrough a bore of diameter greater than the diameter of the valve stem and disposed around the valve stem adjacent each end of the hole and having a complementary mating face engaged with the adjacent parti-circular surface, each first washer opposite from the mating face thereof having a planar surface, and a pair of means for securing each washer from movement along the valve stem in the direction of the reciprocatory motion thereof so that each washer is maintained adjacent the rocker arm, each of the pair of means defining a planar surface disposed normal to the direction of reciprocal motion of the valve stem with which the planar surface of the adjacent washer is engaged.

References Cited by the Examiner

UNITED STATES PATENTS

| | | | |
|---|---|---|---|
| 708,236 | 9/1902 | Leonard | 123—90 |
| 1,499,928 | 7/1924 | Hutt. | |
| 2,209,479 | 7/1940 | Spencer | 123—90 |
| 2,385,309 | 9/1945 | Spencer | 74—519 |
| 2,404,827 | 7/1946 | Chilton | 123—90 |
| 2,478,056 | 8/1949 | Reeg | 308—72 |
| 2,544,582 | 3/1951 | Booth | 74—579 |
| 2,675,279 | 4/1954 | Heim | 308—72 |
| 2,970,583 | 2/1961 | Knoblock | 123—90 |

FOREIGN PATENTS 511,272   8/1939   Great Britain.

MARK NEWMAN, *Primary Examiner.*

FRED E. ENGELTHALER, *Examiner.*

A. L. SMITH, *Assistant Examiner.*